Oct. 23, 1928.
H. E. DOERR
1,688,856
CAR TRUCK SIDE FRAME
Filed April 30, 1927
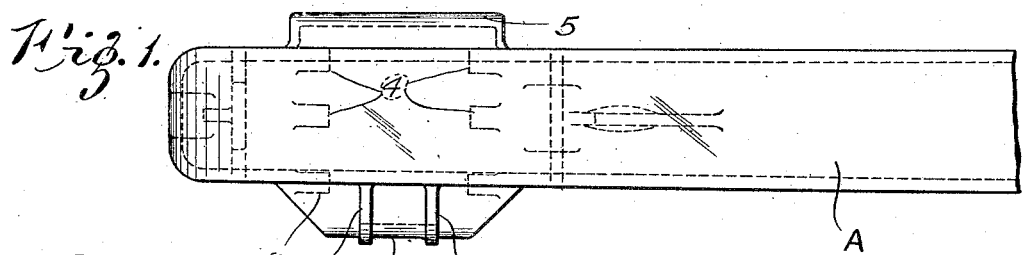
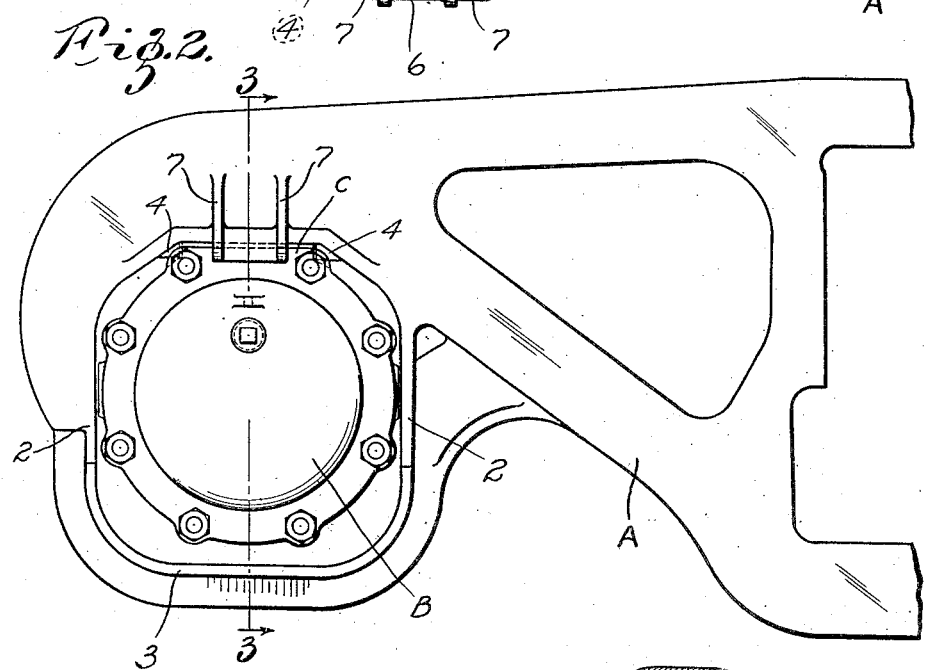
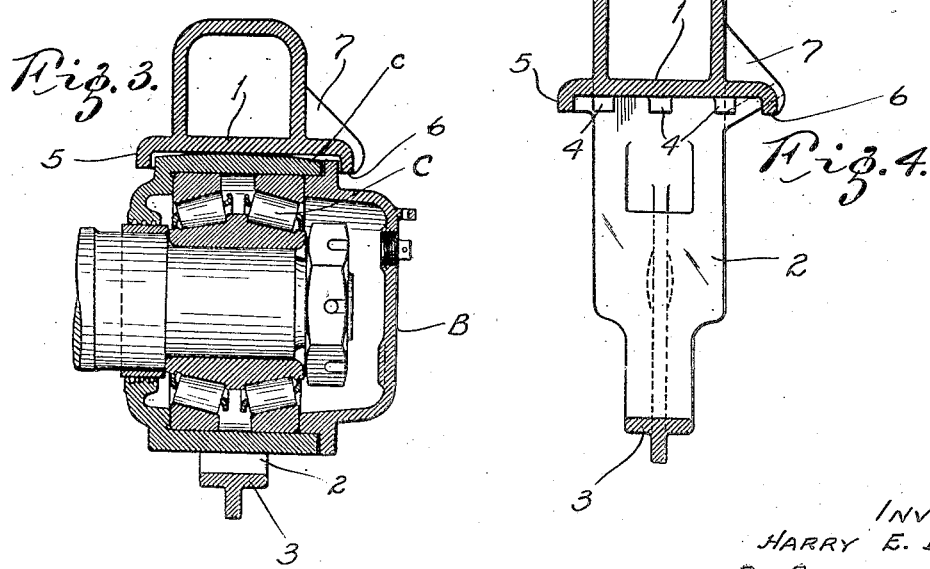
INVENTOR:
HARRY E. DOERR.
BY Bakewell & Church
ATTORNEYS Patented Oct. 23, 1928.

1,688,856

UNITED STATES PATENT OFFICE.

HARRY E. DOERR, OF ST. LOUIS, MISSOURI, ASSIGNOR TO SCULLIN STEEL COMPANY, OF ST. LOUIS, MISSOURI, A CORPORATION OF DELAWARE.

CAR-TRUCK SIDE FRAME.

Application filed April 30, 1927. Serial No. 187,887.

This invention relates to car truck side frames.

The object of the invention is to provide a car truck side frame that is equipped with integral end portions which are constructed so as to receive and surround journal boxes of the type that are provided with roller bearings, said end portions being so designed that they will prevent the journal boxes from moving transversely of the frame and will also prevent the journal boxes from moving out of operative relationship with the side frame in the event the truck boxes derail.

Figure 1 of the drawings is a top plan view of a car truck side frame constructed in accordance with my invention.

Figure 2 is a side elevational view of said side frame.

Figure 3 is a vertical transverse sectional view, taken on the line 3—3 of Figure 2; and Figure 4 is a sectional view similar to Figure 3, but with the journal boxes removed.

Referring to the drawings which illustrate the preferred form of my invention, A designates a car truck side frame which is provided with integral end portions constructed so as to receive journal boxes B of the type that are equipped with roller bearings C, as shown in Figure 3. Each of the end portions of the side frame is provided with a horizontally-disposed part 1 that extends transversely of the side frame and forms a bearing surface of relatively great area that is adapted to act on the top side of the journal boxes, and each of said end portions is also provided with two vertically-disposed guides 2 that embrace the sides of the journal boxes, as shown in Figure 2. In order to prevent the journal boxes from moving out of operatively relationship with the side frame in the event that a car truck becomes derailed, the two vertical side guides 2 on each end portion of the side frame are joined together at their lower ends by a strap or horizontally-disposed portion 3 that is integrally connected to said guides, the straps being normally spaced away from the undersides of the journal boxes, as shown in Figure 2.

The side frame herein illustrated is designed for use with a roller bearing journal box B of the kind which is provided at its top side with a bearing portion $c$ that has straight, parallel side edges which extend transversely of the side frame. Accordingly, I provide each end portion of the side frame with lugs, ribs or other suitable bearing devices 4 that project downwardly from the horizontally-disposed part 1, as shown in Figure 4, and thus form shoulders or abutments that bear against the side edges of the bearing portion $c$ on the top side of the journal box. In order to prevent the journal box from moving transversely of the side frame, the horizontally-disposed part 1 that rests upon the portion $c$ on the top side of a journal box is provided at its ends with integral, depending flanges 5 and 6 that lap over the ends of the part $c$ on the top side of the journal box. If desired, the end portion of the horizontally-disposed part 1 that projects laterally outside of the top member of the side frame can be reinforced and strengthened by gussets or ribs 7 integrally connected to said part 1 and to the top member of the side frame.

A car truck side frame of the construction above described can be easily assembled with or disengaged from roller bearing journal boxes, but when the side frame is in use, the journal boxes are held securely in operative relationship with the side frame, due to the fact that each end portion of the side frame comprises vertical guides 2 that embrace the sides of the journal boxes and sockets that receive the substantially oblong-shaped bearings $c$ on the top sides of the journal boxes, each of said sockets being formed by the horizontally-disposed part 1 of the side frame, the depending flanges 5 and 6 at the ends of said part and the depending lugs or ribs 4 at the sides of the part 1 that embrace the side edges of the bearing portion $c$ on the top side of the journal box. Moreover, as the end portions of the side frame that receive the journal boxes comprise straps or similar elements 3 arranged under the journal boxes and connected to the vertical side guides 2, the journal boxes will not drop out of the side frame in the event the truck becomes derailed. The vertical distance between the straps 3 and the opposed, horizontally-disposed parts 1 of the side frame is enough greater than the depth of the journal boxes to permit said boxes to be slipped endwise into the spaces between the parts 1 and straps 3, and then moved upwardly so as to position the bearings C on the top sides of the journal boxes in the sockets provided for the same.

Having thus described my invention, what I claim as new and desire to secure by Letters Patent is:

1. A car truck side frame designed for use with roller bearing journal boxes and provided with integral end portions that completely surround the journal boxes, and which comprise parts that extend transversely across the underside of the boxes and are normally spaced away from same.

2. A car truck side frame designed for use with roller bearing journal boxes and provided with end portions equipped with side guides that embrace the sides of the journal boxes, each of said end portions being provided with a socket designed to receive a bearing portion on the top side of the journal boxes.

3. A car truck side frame designed for use with roller bearing journal boxes and provided with end portions equipped with side guides that embrace the sides of the journal boxes, each of said end portions being provided with shoulders or abutments that are adapted to contact with the side edges of a bearing portion on the top side of the journal boxes, and means for preventing the journal boxes from moving transversely with relation to the side frame.

4. A car truck side frame designed for use with roller bearing journal boxes and provided with end portions equipped with side guides that embrace the sides of the journal boxes, each of said end portions comprising a horizontally-disposed part that is adapted to bear on the top side of the journal boxes, and means arranged at the ends of said horizontally-disposed part for preventing the journal boxes from moving transversely with relation to the side frame.

5. A car truck side frame designed for use with roller bearing journal boxes and provided with end portions equipped with side guides that embrace the sides of the journal boxes, each of said end portions comprising a substantially horizontally-disposed part that is adapted to bear on the top side of the journal boxes, depending flanges at the ends of said part that lap over a portion of said journal box and prevent it from moving laterally with relation to the side frame, and depending bearings or abutments on said horizontally-disposed part arranged in spaced relation so as to receive a bearing portion on the top side of the journal boxes.

6. A car truck side frame designed for use with roller bearing journal boxes and provided with end portions, each of which comprises a pair of vertically-disposed side guides spaced apart so as to receive the journal box, a strap arranged on the underside of the journal box and integrally connected to said guides, a horizontally-disposed part of greater length than the width of the top member of the side frame that is adapted to bear on the top side of the journal box, and depending portions arranged at the ends and at the sides of said horizontally-disposed part so as to lap over a bearing portion on the top side of the journal box.

HARRY E. DOERR.